United States Patent [19]

Blackmore

[11] Patent Number: 4,472,621

[45] Date of Patent: Sep. 18, 1984

[54] SEPARABLE JUNCTION FOR ELECTRICAL SKIN-EFFECT PIPELINE HEATING SYSTEM

[75] Inventor: Douglas Blackmore, Upper Saddle River, N.J.

[73] Assignee: TPCO, Inc., Monmouth Junction, N.J.

[21] Appl. No.: 264,231

[22] Filed: May 18, 1981

[51] Int. Cl.³ .......................... F16L 53/00; H05B 3/06
[52] U.S. Cl. .................................... 219/301; 137/341;
138/33; 174/47; 219/300; 219/541
[58] Field of Search ............ 219/300, 301, 541, 10.51,
219/10.49; 137/341; 138/33; 174/47

[56] References Cited

U.S. PATENT DOCUMENTS

| | | | |
|---|---|---|---|
| 3,293,407 | 12/1966 | Amdo | 219/301 |
| 3,552,482 | 1/1971 | Amdo | 219/301 X |
| 3,630,038 | 12/1971 | Amdo | 219/301 X |

FOREIGN PATENT DOCUMENTS

| | | | |
|---|---|---|---|
| 2014460 | 1/1971 | Fed. Rep. of Germany | 219/301 |
| 1052739 | 9/1953 | France | 219/301 |
| 2256622 | 7/1975 | France | 219/301 |

Primary Examiner—A. Bartis
Attorney, Agent, or Firm—Darby & Darby

[57] ABSTRACT

A separable junction for an electric pipeline system of the type including a tracer for skin-effect heating, which tracer comprises an insulated conductor within an electrically conductive conduit, incorporates flanges at the ends of the pipe section to be joined and the pipes are joined by securing bolts through holes in the flanges. Each end of the tracer conduit on each of the sections of pipe is terminated at and electrically connected to a metallic junction box adjacent to a flange and the tracer conductor thereof extends into the box. Each box has an opening aligned with one of the flange holes for the fastening bolts, but when the junction is assembled, the flange bolt which would be in alignment with the junction box opening is replaced with a hollow, threaded metallic nipple which is dimensioned to fit freely through the bolt holes in the flanges and is long enough to extend between and into the openings of the junction boxes at either side of the junction and electrically connect the boxes. The nipple is held in position by a pair of spaced nuts which are screwed onto the nipple and against the opposed flanges. An insulated jumper wire extends through the nipple between the two junction boxes and connects the tracer conductors. The jumper wire, junction boxes and nipple then become part of the tracer, whereby skin-effect heating is achieved along the entire length of pipe and, particularly, in the flanges at the separable junction.

10 Claims, 3 Drawing Figures

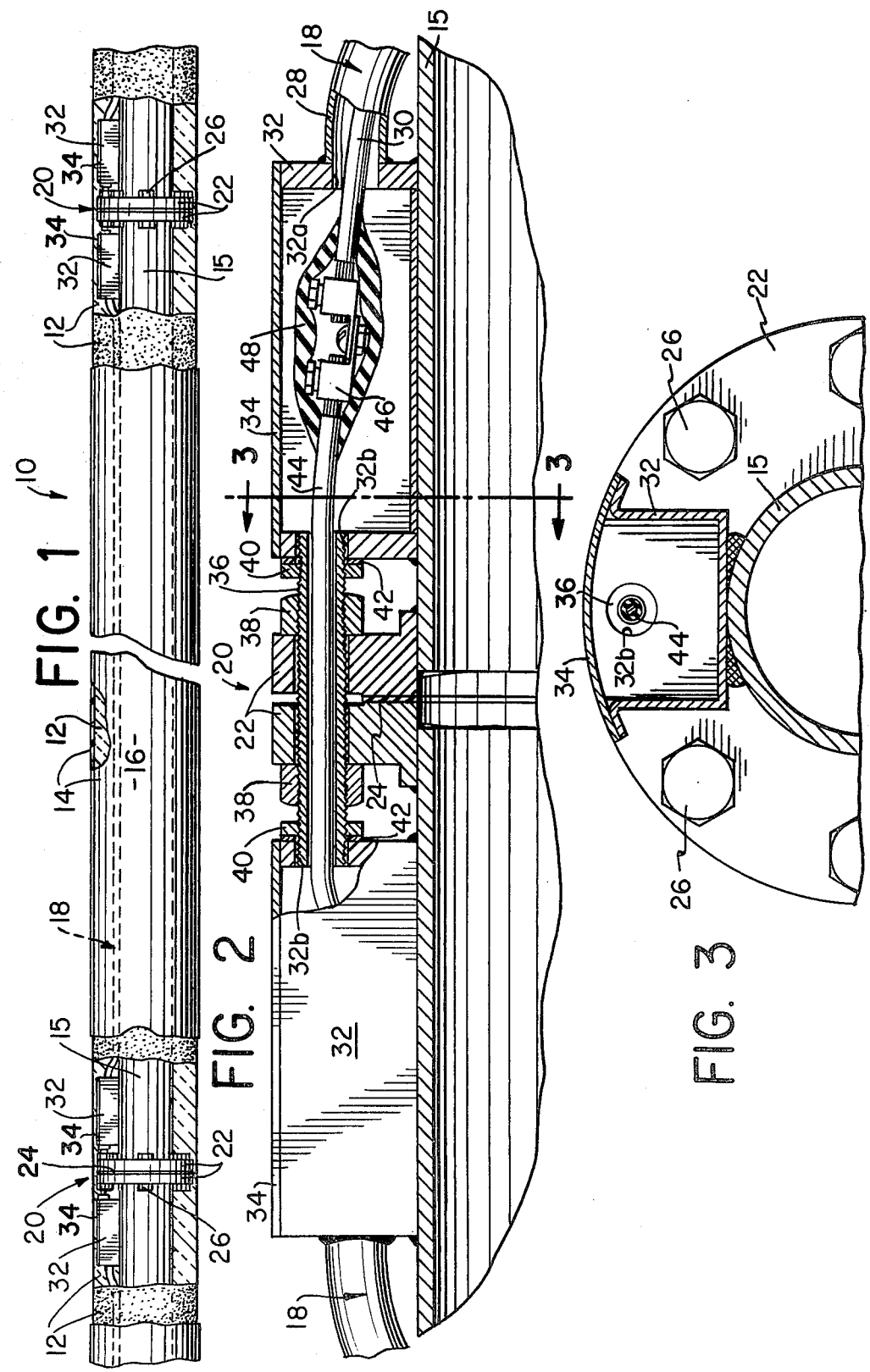

SEPARABLE JUNCTION FOR ELECTRICAL SKIN-EFFECT PIPELINE HEATING SYSTEM

The present invention relates generally to electrical heating systems for fluid transport pipe and, more particularly, concerns apparatus providing a separable junction in a fluid transport pipe system employing skin effect heating.

Today, pipelines are widely used to transport fluids over long distances. Most notable among these is the recently completed Alaskan oil pipeline. When such pipelines are run through areas having a cold climate, particular problems are encountered, since the cold increases the viscosity of the oil and makes it difficult, if not impossible, to transport the oil effectively, since it is not readily pumped. One solution to this problem has been to heat the transport pipe, thereby avoiding appreciable thickening of the oil ocassioned by low temperatures.

One well-known type of system for heating fluid transport pipe utilizes the skin-effect principle. In such a system, a heating element tracer including a conduit of small diameter is run along the length of the transport pipe and is secured to it, for example, by welding. The tracer conduit is usually made of a ferrous metal and has an insulated conductor running through its interior for its entire length. At one end of the tracer, the conduit and conductor are electrically connected together, and at the other end, a source of AC power is connected between them. The tracer conduit and conductor thereby form a series electrical circuit across the source and, owing to the "skin-effect" the flow of electrical current along the tracer conduit is restricted to the interior surface thereof and a small penetration depth outwardly therefrom. The thin sheet of current flowing in the tracer conduit flows oppositely to that in the conductor and produces heat; this heat is conducted from the tracer to the fluid transport pipe by virtue of the connection therebetween.

It is a common practice in pipeline systems to provide removable sections in order to facilitate replacement, cleaning and repair. A typical arrangement for providing a removable section of pipe is to furnish the section, at either end, with a flange. The pipeline is then formed from such flanged sections by abutting the flanges of adjacent sections and then securing them together, for example, by means of bolts which extend through opposed flanges and are tightened to hold the flanges together securely. Typically, the entire pipeline, including the flanges, is surrounded by a thick layer of thermal insulation, in order to avoid excessive loss of heat from the pipe.

When skin-effect heating is provided in a pipeline including removable sections, the tracer conduit and conductor must be made separable at the separable junction defined by a pair of opposed flanges. This has been achieved by terminating the tracer and its conductor just short of the flange on each pipe section forming the joint and then connecting electrical jumper wires between the tracer conduits and conductors on either side of the junction. Such an arrangement has the substantial shortcoming that no heat is generated at the separable junction. Owing to the large surface area of the flanges, substantial heat loss can be expected at the separable junction. This, and the total absence of heat generation at the junction, result in pronounced cold spots at the junctions. These cold spots make it impossible to maintain a uniform temperature over a length of pipe and result in a substantial waste of energy, since the pipeline must be heated excessively in order to maintain the junctions at an acceptable temperature. A further shortcoming is that the jumper wires across the junction are exposed and the danger exists that they may be accidentally broken or severed.

Broadly, it is an object of the present invention to provide a separable junction in a skin-effect heating system for a pipeline which avoids the shortcomings of prior art heating systems.

It is specifically an object of the present invention to provide a separable junction for a skin-effect pipeline heating system which permits the generation of heat directly at the junction.

It is yet another object of the present invention to provide a separable junction for a skin-effect pipeline heating system which eliminates the use of any exposed jumper wires.

It is yet another object of the present invention to provide a separable junction for a skin-effect pipeline heating system which may be utilized on existing pipeline and in existing systems with little or no modifications thereto.

It is also an object of the present invention to provide a separable junction for a skin-effect pipeline heating system which is reliable and convenient in use, yet relatively inexpensive in construction.

In accordance with an illustrative embodiment demonstrating objects and features of the present invention, the tracer conduit on each section of pipe is terminated at a junction box adjacent to the flange and the tracer conductor extends into the box. Each box is aligned with one of the flange holes which receives a fastening bolt. When the junction is assembled, the flange bolt which would be in alignment with the junction boxes is replaced with a hollow, threaded nipple which is dimensioned to fit freely through the bolt holes in the flanges and is long enough to extend between and into the junction boxes at either side of the junction. This nipple is held in position by a pair of spaced nuts which are screwed onto the nipple against the opposed flanges. A jumper wire can then be run through the nipple between the two junction boxes. The jumper wire, junction boxes and nipple then become part of the tracer, whereby skin-effect heating is achieved along the entire length of pipe and, particularly, in the flanges at the separable junction.

The foregoing brief description, as well as further objects, features, and advantages of the present invention will be more completely understood from the following detailed description of a presently preferred, but nonetheless illustrative, embodiment in accordance with the present invention, with reference being had to the accompanying drawing, wherein:

FIG. 1 is a plan view of a pipeline employing a separable junction in accordance with the present invention, with portions being broken away to show certain construction details;

FIG. 2 is a sectional view, on an enlarged scale, showing the construction details at the junction itself; and FIG. 3 is a sectional view taken along a line 3—3 in FIG. 2 to show further construction details.

Referring now to the details of the drawing, there is a shown an electrically heated pipeline 10 which is entirely enclosed by a thermally insulative material 12 and surrounded by a protective jacket 14 made, for example, of a hardened plastic material. As is common the pipeline includes a fluid transport pipe 15 and a tracer 18 mounted in contact with the pipe to provide skin-effect heating. The pipeline includes a detachable section 16 which is secured to the pipeline by means of the separable joints or junctions 20, 20, in accordance with the present invention. The junctions 20, 20 provide for the continuity of the fluid transport pipe 15 and the tracer 18.

Each junction 20 includes a flange 22, which is formed at either end of each pipe section, and thermally conductive is gasket 24 sandwiched between the abutting ends of the pipe sections forming the junctions. These flanges are secured in abutment by means of fasteners 26 comprising a bolt and nut, which extend through holes in both flanges and serve to secure them together tightly.

The tracer 18 includes a conduit 28 which is secured to the surface of the fluid transport pipe 15, for example by welding, and is preferably made of a ferrous metal, in order to achieve a shallow penetration depth for the skin-effect current. Tracer 18 also includes an insulated conductor 30 within the conduit 28. In the vicinity of the junction 20, tracer conduit 28 terminates ahead of the flange 22 at a junction box 32 and the conductor 30 extends into the interior of the junction box 32 through an opening 32a. The conduit 28 is preferably secured to the box 32, as by welding.

Each junction box 32 is preferably made of a ferrous material and is secured to the surface of fluid transport pipe 15, as by welding. The junction box 32 includes a cover 34 which is detachably secured to the top of the box, for example by means of attachment screws (not shown). The cover 34 is also preferably made of a ferrous material. At the end opposite the termination of conduit 28, junction box 32 includes a second opening 32b, which is aligned with one of the bolt holes in the respective flange 22.

In place of the fastener 26 adjacent to the box 34, there is provided a threaded nipple 36, preferably made of a ferrous metal. The diameter of the nipple 36 is selected to permit it to move freely through the bolt holes in flanges 22, as well as the openings 32b, and its length is selected to permit it to extend simultaneously into the openings 32b of the junction boxes 32 at opposite sides of the junction 20. The nipple 36 is secured to the flanges 22, 22 by tightening the flange nuts 38, 38 against their respective flanges. In addition, the jamb nuts 40, 40 are each adjusted to secure an electrically conductive gasket 42 against the respective junction box 32.

A jumper wire 44 is run through the interior of the nipple and between the junction boxes 32, 32 and, at either end, is secured to the tracer cable 30 by means of a conventional splicing connector or lug 46. This spliced joint is wrapped with high temperature electrical tape 48, or the like.

In operation, the tracer conduit 28 and conductor 30 are connected together at one end of the pipeline and are connected across a source of AC power at the opposite end of the pipeline. This places the conduit 28 and conductor 30 in series with the power source, so that electrical current flows in opposite directions in the conductor 30 and on the interior surface of the conduit 28. From an electrical point of view, the tracer conductor 30 runs continuously through the junction boxes 32 and the nipple 36. Similarly, the junction boxes 32 and nipple 36 form a continuous circuit with the tracer conduit 28, from an electrical point of view, and conduct the conduit current on their interior surfaces. Inasmuch as the nipple 36 and junction boxes 32 are made of a material which is similar to the conduit 28, they provide similar skin-effect heating. The heat produced in the junction boxes 32 is transmitted by conduction to the fluid transport pipe 15 through the bottom of the junction boxes, and the heat generated within nipple 36 is transmitted by conduction to the flanges 22. Hence, the disclosed system provides skin-effect heating uniformly along the entire length of the pipeline, including at the flanges 22 forming the separable junction 20.

Although the preferred form of the invention has been disclosed for illustrative purposes, it will be appreciated by those skilled in the art that many additions, modifications and substitutions are possible without departing from the scope and spirit of the invention as disclosed in the accompanying claims. For example, it is not necessary to provide two junction boxes. A single junction box may be used if the tracer conduit of the pipe section which has no junction box is provided with connector for attachment directly to the nipple and/or the respective flange and the respective tracer conductor is passed through the nipple to the junction box. It will also be appreciated that more than one nipple could be provided in the flange and that a junction box could connect the tracer to multiple nipples and jumper wires, in order to distribute the heating effect over the flanges.

What is claimed is:

1. In an electrical pipeline heating system of the type including tracer means extending along said pipeline in contact therewith, said tracer means having a metallic conduit and a conductor within said conduit and electrically insulated from said conduit, said conduit and conductor being electrically connected in circuit with a source of AC power to cooperatively produce heating by means of the skin-effect, the improvement comprising a separable junction for connecting two adjacent sections of said pipeline positioned with their ends in abutment, said junction comprising:

flange means at the abutting end of each of said pipeline sections for detachably connecting said pipeline sections in endwise abutment, the abutting ends of said pipeline sections being detachably connected by said flange means, each of said flange means having a passageway extending therethrough, said passageways being in alignment;

a first metallic junction box secured in contact with one of said pipeline sections in close proximity to the flange means thereof, the tracer conduit of said one pipeline section terminating at said junction box and being electrically connected thereto, the conductor of said tracer extending into said junction box through an opening therein, said junction box having a second opening positioned in alignment with said flange passageways;

a hollow, elongated metallic member mounted to extend from within said flange passageways and into said junction box through the second opening, said elongated member being electrically connected to said junction box;

means for electrically coupling the tracer conduit of the other of said pipeline sections to said hollow member; and means in said junction box for connecting the tracer conductor of said one pipeline section with the tracer conductor of said other pipeline section through the interior of said hollow member, the tracer conductor of said one pipeline section being connected with the tracer conductor of said other pipeline section by said means for connecting.

2. The junction of claim 1 wherein said coupling means comprises a second metallic junction box mounted in contact with said other pipeline section in close proximity to the flange means thereof, the tracer conduit of said other pipeline section terminating at said second junction box and being electrically connected thereto, the conductor of said other tracer extending into said second junction box through a first opening therein, said second junction box having a second opening in alignment with said flange passageways, said hollow member extending into said second junction box through the second opening thereof, said connecting means comprising a jumper wire extending between said first and second junction boxes through said hollow member and splicing connectors joining said jumper wire with the tracer conductor of the respective pipeline section.

3. A junction in accordance with any claim 2 wherein said hollow member is a threaded nipple having a diameter no greater than the diameter of said flange passageways and the second openings of said junction boxes, said nipple being sufficiently long to extend from one of said junction boxes to the other, said junction further comprising first and second flange nuts on said nipple each secured against a respective one of said flange means, a first jamb nut on said nipple secured against said first junction box, and a second jamb nut on said nipple secured against said second junction box, said nipple being detachably secured to said flange means and in said junction boxes by means of said flange nuts and said jamb nuts.

4. A junction in accordance with claim 3 wherein at least one of said hollow member, said junction boxes, and said coupling means is made of a ferrous material.

5. A junction in accordance with any claim 2 wherein at least one of said hollow member, said junction boxes, and said coupling means is made of a ferrous material.

6. A junction in accordance with claim 2 wherein said junction boxes have a detachably mounted top.

7. A junction in accordance with claim 1 wherein said hollow member is a threaded nipple having a diameter no greater than the diameter of said flange passageways and the second opening of said junction box, said nipple being sufficiently long to extend from said junction box through and beyond said flanges, said junction further comprising first and second flange nuts on said nipple each secured against a respective one of said flange means, a jamb nut on said nipple secured against said first junction box, said nipple being detachably secured to said flange means and in said junction box by means of said flange and jamb nuts.

8. A junction in accordance with claim 7 wherein at least one of said hollow member, said junction box, and said coupling means is made of a ferrous material.

9. A junction in accordance with claim 1 wherein at least one of said hollow member, said junction box, and said coupling means is made of a ferrous material.

10. A junction in accordance with claim 1 wherein said junction box has a detachably mounted top.

* * * * *